Sept. 1, 1964         J. G. MADGE         3,146,696
                GLASS PREPRESSING ROLLS
Filed Nov. 4, 1960                      8 Sheets-Sheet 1

INVENTOR.
JOSEPH G. MADGE
BY
P. F. HILDER
ATTORNEY

United States Patent Office 3,146,696
Patented Sept. 1, 1964

3,146,696
GLASS PREPRESSING ROLLS
Joseph G. Madge, Dearborn, Mich., assignor to Ford Motor Company, Dearborn, Mich., a corporation of Delaware
Filed Nov. 4, 1960, Ser. No. 67,217
10 Claims. (Cl. 100—45)

This invention relates to the production of laminated safety glass, and more particularly to an apparatus for applying pressure to two curved sheets of glass having a sheet of plastic interposed therebetween, as used in the production of laminated automobile windshields.

As was more fully described in U.S. Patent 2,673,168, the conventional production of laminated safety glass involves the insertion of a lamina of sheet plastic material, such as polyvinyl butyrate, between two sheets of glass to form a so-called "sandwich." The assembly or sandwich is then subjected to de-airing and tacking processes. Generally, the sandwich is twice passed endwise through squeeze rolls adapted to apply a nipping or squeeze type pressure starting at one end of the sandwich and progressively passing down the length of the sandwich to the other end.

The first pass has as its objective the elimination of air pockets between the layers; that is, the de-airing of the sandwich. Before being passed through the rolls a second time, the de-aired sandwich is heated to a tempertaure sufficient to render the vinyl plastic tacky. The assembly is then passed through the roll to cause the glass layers to adhere more completely to the plastic interlayer. After the second or tacking pass through the rolls, the windshield is said to be prepressed and is ready for immersion in the heated oil of an autoclave to complete the bond between the glass and plastic and thus render the windshield transparent.

The squeeze rolls through which the glass-plastic sandwich is passed for de-airing and tacking may consist of a pair of opposed rolls, each turning on its own axis. Squeeze rolls for handling modern automobile windshields having more or less compounding (vertical as well as horizontal curvature) may be formed of a number of relatively narrow sets of opposed rolls being spring or otherwise biased and capable of upward or downward displacement so that the nip or line of contact of the opposed rolls may follow the changing contour of the vertical cross-section of the windshields. In this manner, more or less uniform pressure is applied to both faces of the windshield across the entire vertical height thereof or width of the glass as it is passed between the rolls.

Prepress rolls frequently are mounted in a rocking frame which may be rocked in one direction for entrance of one end of the windshield assembly. The frame is then rocked during the passage of the assembly therethrough until the frame is inclined in the opposite direction for discharge of the assembly onto a conveyor. The degree of inclination of the frame during entrance to and exit of the windshield from between the rolls is dependent in large part on the amount of "side wrap" (curvature at the ends of the windshield). If the rocking frame supporting the prepress rolls is more or less balanced on its pivot, the rolls and frame will tend to assume a position perpendicular to a plane tangent to the curvature of the windshield assembly along the line of contact between the assembly and the rolls. However, the frame assembly is relatively heavy, ordinarily weighing several hundred pound and the inertia of the frame assembly has been found to break windshields, particularly in the zones of minimum radius of horizontal curvature adjacent the wrap-around portions at the ends of the windshield assembly and also at the ends of the wrap-around portions of the windshield assembly where it has a greatly reduced width (vertical height).

The present invention is directed to power controls which will lock the frame in position for receiving and discharging the ends of the glass-plastic windshield assembly and which will operate under the control of feelers contacting the glass at each side of the nip of the rolls during travel of end portions of the assembly of greater longitudinal curvature between the rolls to maintain the frame generally perpendicular to the glass at the nip. At other times, particularly during pressing of the central zone of the windshield assembly, in which the radius of longitudinal curvature is rather large, the frame is rocked under the power control so as to tilt the frame past the vertical towards position for discharge.

Among the objects of the present invention are to provide improved controls for tilting the frame of prepress rolls of the type described so as to positively position the frame and rolls for receipt and discharge of a windshield assembly from between the rolls; to provide an improved mechanism for maintaining the plane of the axes of the rolls generally perpendicular to the glass at the line of contact; to provide for control of the frame tilting responsive to the contour of the glass during a portion of the passage of the windshield therethrough and responsive to predetermined positions of tilt of the frame during passage of other portions of the assembly therethrough; and generally to improve machines of the type described.

Other objects, and the nature and scope of the invention will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of the specification, in which:

FIGURE 9 is a schematic diagram of the pneumatic and hydraulic control circuits of the machine.

The machine of the present invention comprises a base 20 and uprights 21 and 22 arranged one on each side of the machine. A rocking frame 24 is supported for oscillation on the uprights 21 and 22 on an axis formed by stub shafts 25 and 26 projecting laterally from the rocking frame and received within journal bearing 27 and 29 on the uprights. The axis of the shafts 25 and 26 preferably is inclined to the horizontal as indicated in the drawings.

Sets of opposed nipper rolls are mounted in the frame 24, the axes of the rolls lying generally in the plane of the frame and the rolls being capable of moving upwardly and downwardly within the plane of the frame to accommodate themselves to the transverse contour of a laminated glass and plastic assembly inserted between the rolls in order to put more or less uniform pressure against both sides of the assembly across the entire width thereof. Except at the center of the machine, both the upper and lower rolls are idler rolls, being rotated by passage of the glass. One set of opposed upper and lower idler rolls 30 and 31 is shown. The other sets are arranged as indicated in Madge et al. patent application S.N. 772,794, now U.S. Patent No. 3,048,214.

Driven lower rolls 32 are mounted about midway of the frame 24 for rotation on a fixed, horizontal axis. These rolls are opposed by idler rolls 34. The driven rolls 32 may be driven at a uniform speed and propel the laminated windshield assembly forwardly between the rolls, the idler rolls 30, 31 and 34 and other idler rolls, not shown, rising or falling as necessary to conform to the contour of the assembly as it passes between the rolls. For quicker passage through the rolls, however, the drive speed of driven rolls 32 may be increased during the "swing" period between positions No. 2 and No. 3 of FIGURE 14, at which time the relatively flat central portion of the windshield assembly is being pressed.

The opposed idler rolls 34 may be mounted as shown in Madge and Walker Patent 3,048,214 of August 7, 1962. Each individual roll 34 is supported on a carrier 38 which is received within guides 43 carried by the frame 24. Springs 48, extending between the frame 24 and the carrier 38, resiliently urge the rolls 34 against the driven rolls 32.

Outrigger supporting rolls 35, 35 are provided one on each side of the frame 24, these rolls being generally aligned with the driven lower rolls 32 and being supported for rotation on brackets 36, 36. The rolls 35, 35 aid in supporting the windshield assembly during its entrance between and exit from the pressing rolls. The top of the rolls 35, 35 are located at generally the same elevation as the tops of the driven rolls 32. Inasmuch as the brackets 36, 36 are mounted on the rocking frame 24, the rolls 35, 35 will rock with the frame 24 and pressing rolls.

The frame 24 is rocked by a circular vane-type hydraulic motor 37 which, through a sprocket 39 and chain 40, drives a sprocket 41 fixed to the stub shaft 25. The motor 37 is arranged to rock the frame sufficiently far to accommodate entrance or exit of any wrap-around windshield shape. It has been found that rocking of the frame 24 up to a maximum of 80° from the vertical in either direction (a total swing of 160°) is sufficient for any desired windshield shape. Certain shapes require less swing, depending on the contour of the side-wrap portions of the windshield.

A brake disc 42 is fixed to the stub shaft 26, projecting generally radially from the shaft. A pneumatically operated brake 44 mounted on the upright 21 and having a pair of brake disc engaging elements 45, 45 serves to engage the disc 42 and holds the frame 24 in fixed position during entrance or exit of the windshield assemblies from between the rolls. The operation of the brake 44 will be explained more fully in connection with the description of the control and operation of the machine. If desired, a hand wheel 46 may be fixed to the stub shaft 26 adjacent the brake disc 42 to permit rocking of the frame 24 by hand.

During passage of the end portions of the windshield assembly, including the portions of minimum radius of curvature, rocking of the frame 24 is controlled by the contour of the windshield, with the object of maintaining the general plane of the axis of the pressing rolls perpendicular to a tangent plane passing generally through the portion of the glass contacted by the rolls. This results in exerting pressure on the assembly perpendicular to the surface of the glass for better tacking and minimizes breakage of glass.

Figure 1:
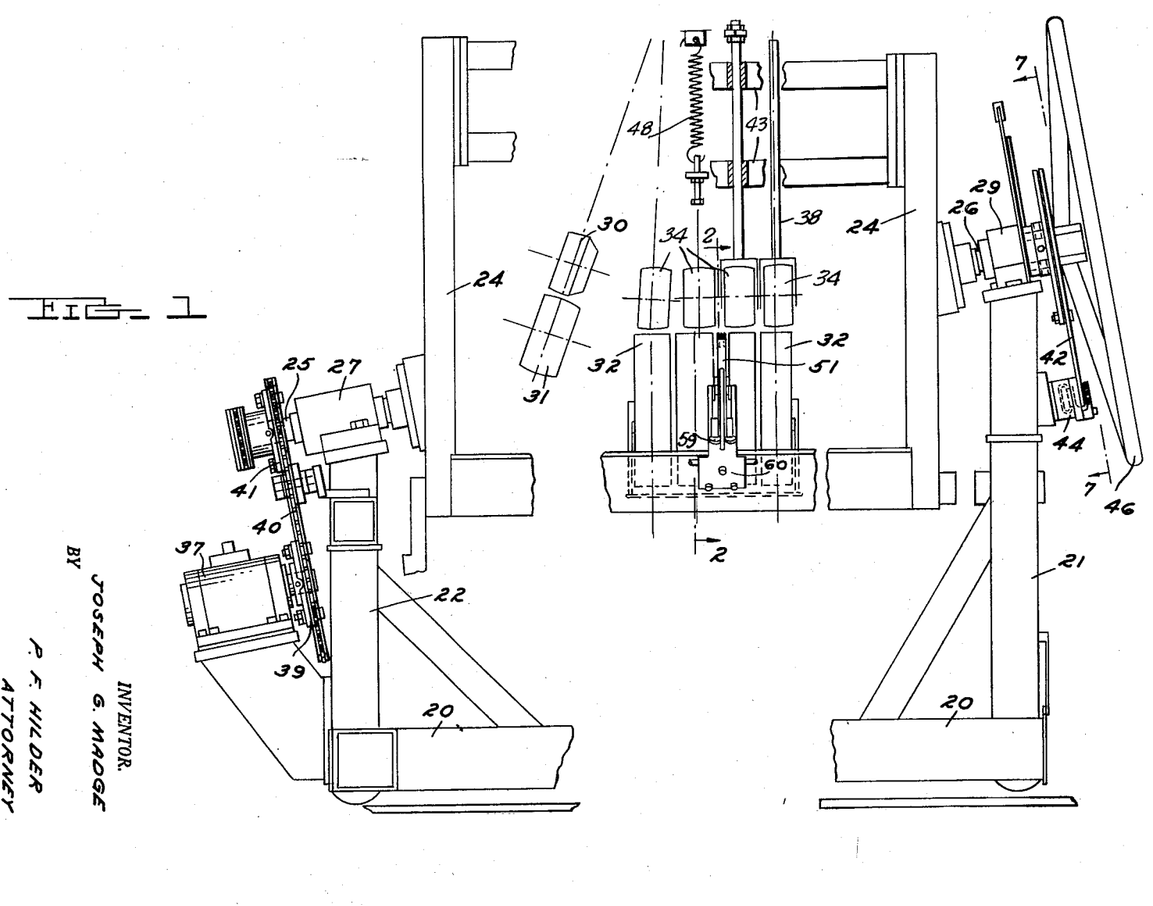
FIGURE 1 is a side elevation of a machine of the type described to which controls according to the present invention have been applied, portions of the machine being broken away or shown in broken line for convenience of illustration.
Figures 2, 3, 4:
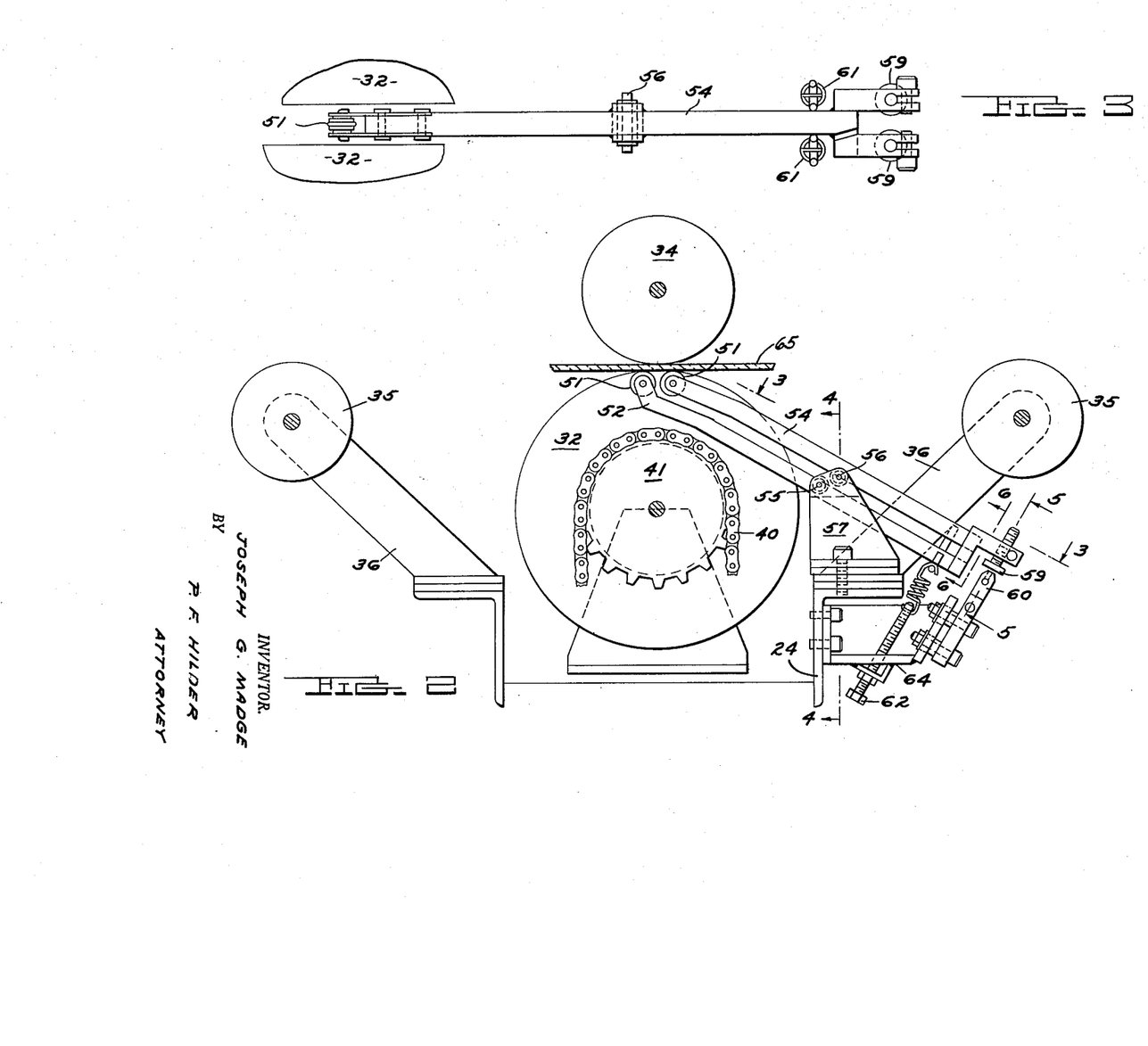
FIGURE 2 is an enlarged vertical section of the prepress rolls and sensing mechanism for control of the frame tilting responsive to glass contour, taken generally along the line 2—2 of FIGURE 1.
FIGURE 3 is a top view of the control arm assemblies for sensing contour of the glass adjacent the rolls, portions of certain of the rolls being shown in broken line.
FIGURE 4 is a vertical section of the glass contour sensing arm assemblies and associated parts, taken generally along the line 4—4 of FIGURE 2.
Figure 4:
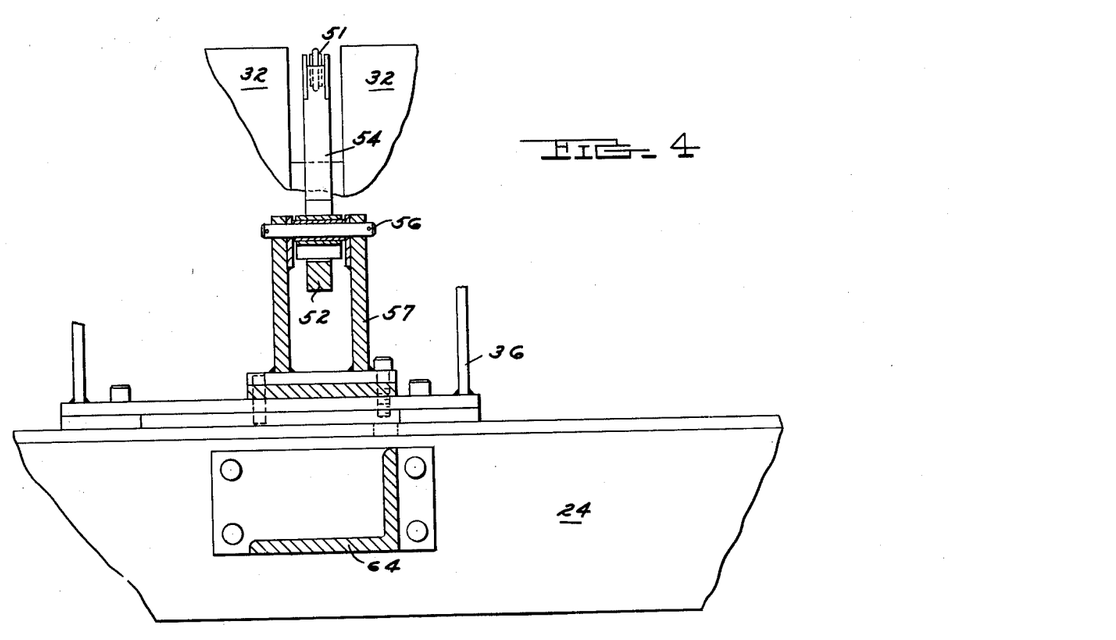
Figure 5:
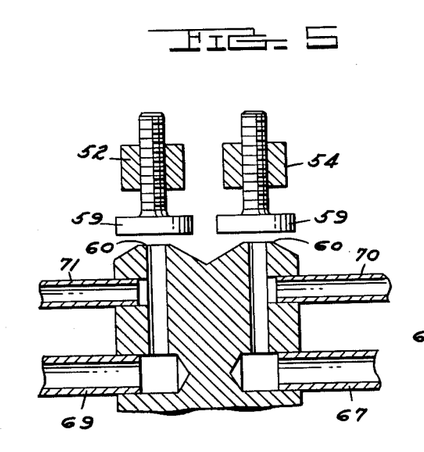
FIGURE 5 is an enlarged vertical section of the differential jet control, taken generally along the line 5—5 of FIGURE 2.
Figure 6:
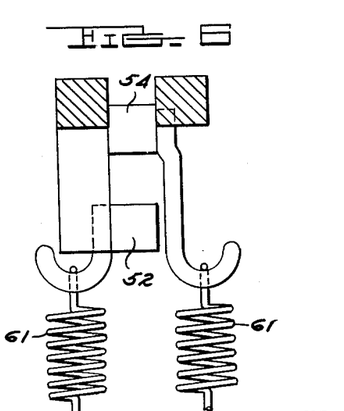
FIGURE 6 is a transverse section of the glass contour sensing arms, taken generally along the line 6—6 of FIGURE 2.
Figures 7, 8:
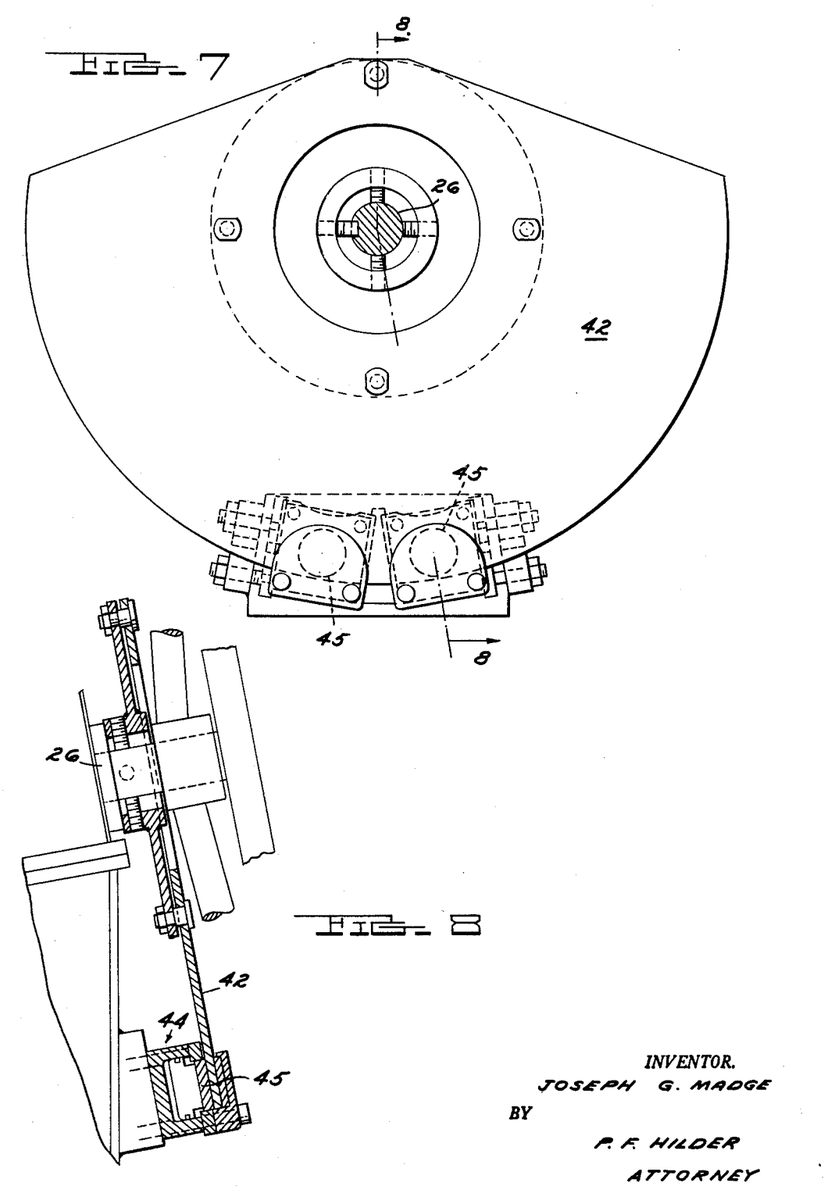
FIGURE 7 is an enlarged plan view of the frame brake assembly, taken generally along the line 7—7 of FIGURE 1.
FIGURE 8 is a transverse section of the brake assembly taken generally along line 8—8 of FIGURE 7.
Figure 10:
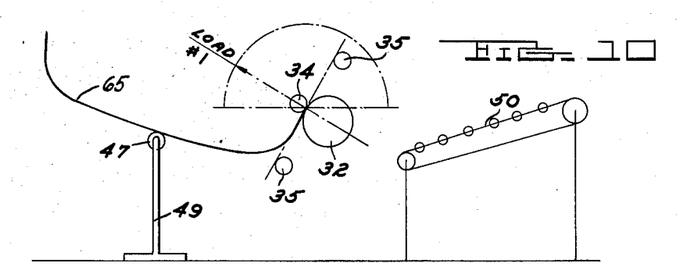
FIGURES 10–13 are schematic views of the passage of a windshield assembly through the rolls, showing the relative position of the assembly and the rolls.

The position of the windshield upon entering the rolls and during pressing of the entering end portion is determined in part by a supporting roll 47 on a stand 49 on the load or entrance side of the rolls (see FIGURE 10). The position of the windshield assembly during pressing of the exit end portion is determined in part by a conveyor 50 positioned on the exiting or discharge side of the pressing rolls (see FIGURE 13). During these periods, the windshield is supported both by the pressing rolls and by either the roll 47 or the conveyor 50 and therefor is not free to adjust itself to the position of the rolls. Further, during both of these periods, there is a large overhanging weight of the windshield assembly projecting from one side or the other of the rolls, which, if the rolls tended to lift the unsupported end of the assembly from the roll 47 or the conveyor 50, would result in exerting a large bending moment on the windshield assembly where engaged by the pressing rolls. Accordingly, during this period, the rolls are caused to adjust themselves to the changing curvature of the windshield assembly rather than the position of the windshield assembly being determined by the position of the frame 24 and the rolls. To this end, a pair of relatively small diameter rubber tired rolls 51, 51 are located generally along a line at right angles to the line of contact of the rolls. These rolls may be located to roll against the underside of the glass-plastic assembly and between the driven lower rolls 32, which rotate on a fixed axis. The rolls 51, 51 are located a short distance each side of the nip of the rolls or plane through the axes of the driven rolls and opposing idler rolls.

The rolls 51 are mounted on the upper ends of the levers 52 and 54, which in turn are free to turn on horizontal pivot pins 55 and 56 supported by a bracket 57, in turn supported by the rocking frame 24 of the machine. The levers 52 and 54 extend downwardly beyond the pins 55 and 56, and each lever carries a flat headed screw or pad 59. The pads 59, 59 cooperate with a pair of air jets 60, 60 carried from the frame 24, movement of the lower ends of the levers 52 and 54 carrying the pads 59 towards the jets tending to close the jets and movement of the lower ends of the levers away from the jets tending to open the jets. Each of the levers 52 and 54 is provided with a spring 61 for biasing the lower end of the lever and the pad towards the corresponding jet 60. Preferably, the tension of the spring 61, 61 may be adjusted by a screw 62 threaded engaged in an abutment 64 on the frame 24, the abutment also serving to support the air jets 60, 60.

The arrangement is such that as the end portions of the windshield assembly are fed between the rolls, if the plane defined by the axes of the rolls is not generally perpendicular to the plane through the line of the contact between the rolls and the glass at the center of the machine, one of the rolls 51 will be depressed a greater amount than the other roll 51, thus rocking one of the levers 52 and 54 on its axis so as to open one of the air jets 60, 60 slightly more than the other air jet. This results in a rocking or tilting of the rocking frame 24 to restore and maintain the plane of the axes of the pressing rolls in a position generally perpendicular to the assembly by a control mechanism to be described, which causes actuation of the hydraulic motor 37.

The control system operated in response to sensing of the position of the portion of the assembly 65 adjacent the rolls includes a supply line 66 of air under pressure which is fed to each of the air jets 60 through air lines 67 and 69. Air lines 70 and 71 communicate with the lines 67 and 69 adjacent the jets 60, 60 and lead to opposite sides of a flexible diaphragm 72 located within a pneumatic chamber 74. Movement of one of the pads 59 a further distance from its jet 60 than the other pad will permit air to pass more easily through the jet and will cause a greater drop in pressure in the lines 70 or 71 with corresponding displacement of the diaphragm 72 towards the low pressure side of the chamber 74.

The diaphragm 72 is connected to a pivotally mounted hydraulic jet 75 of an "Askania" control by means of a link 76. The movable jet 75 discharges hydraulic fluid under pressure to a pair of hydraulic lines 77 and 79, which are arranged side by side to receive discharge of fluid from the jet 75. The lines 77 and 79 lead to opposite sides of the hydraulic motor 37. The arrangement is such that movement of the jet 75 away from a position centered between the lines 77 and 79 and towards one or the other of the lines causes a greater pressure in that line and actuation of the hydraulic motor 37 to tilt or rock the frame 24. This actuation continues until rocking of the frame 24 relative to the windshield assembly 65 has equalized the openings of the jets 60, 60, thus recentering the hydraulic jet 75 and providing equal pressure in the hydraulic lines 77 and 79. In the above-described mechanism, inclination of the assembly in either direction unbalances the "Askania" control by additionally opening one jet 60 at the same time that the other jet 60 is moved towards closed position, which magnifies the signal and gives a sensitive, rapid and accurate connection.

The hydraulic system for powering the "Askania" control, above described, and for swinging the rocking frame 24, includes an electric motor 80, which drives a hydraulic pump 81 (see FIGURE 9). The pump 81 delivers hydraulic fluid under pressure from a tank or sump 82 through a pump discharge line 84 leading to the movable jet 75 of the "Askania" control. A solenoid operated valve 85 in the line 84 is biased to deliver hydraulic fluid to the jet 75 for jet control of the frame 24 and to pass the oil to sump and may be actuated to direct oil to a solenoid operated three position valve 86 for actuation of the hydraulic motor 37 responsive to a control to be described. The valve 86 is biased to block lines 87 and 89 but may be actuated to direct oil flow to either line to actuate motor 37 in either direction.

Hydraulic lines 87 and 89 extend from the valve 86 to the lines 77 and 79 leading to the motor 37. Hydraulic lines 90 and 91 extend from the "Askania" control chamber 78 and valve 86, respectively, to the sump 82 to provide for return of oil to the sump. A solenoid controlled two position valve 83, biased to closed position, is inserted in lines 77 and 79 as indicated in the drawings.

Figures 13, 14:
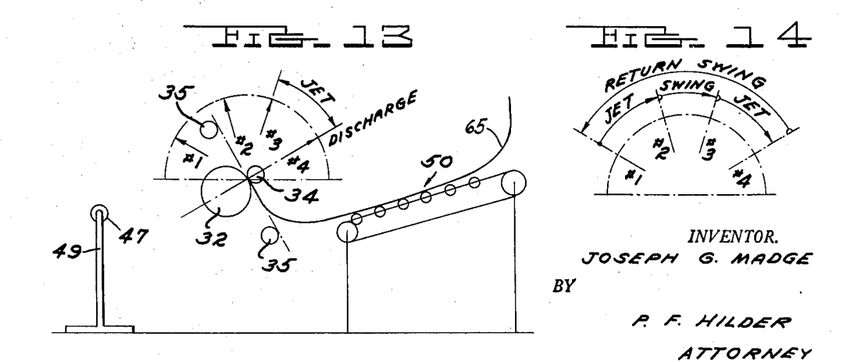
FIGURE 14 is a diagram indicating functional control of the frame tilting during its travel.
Figures 15, 16:
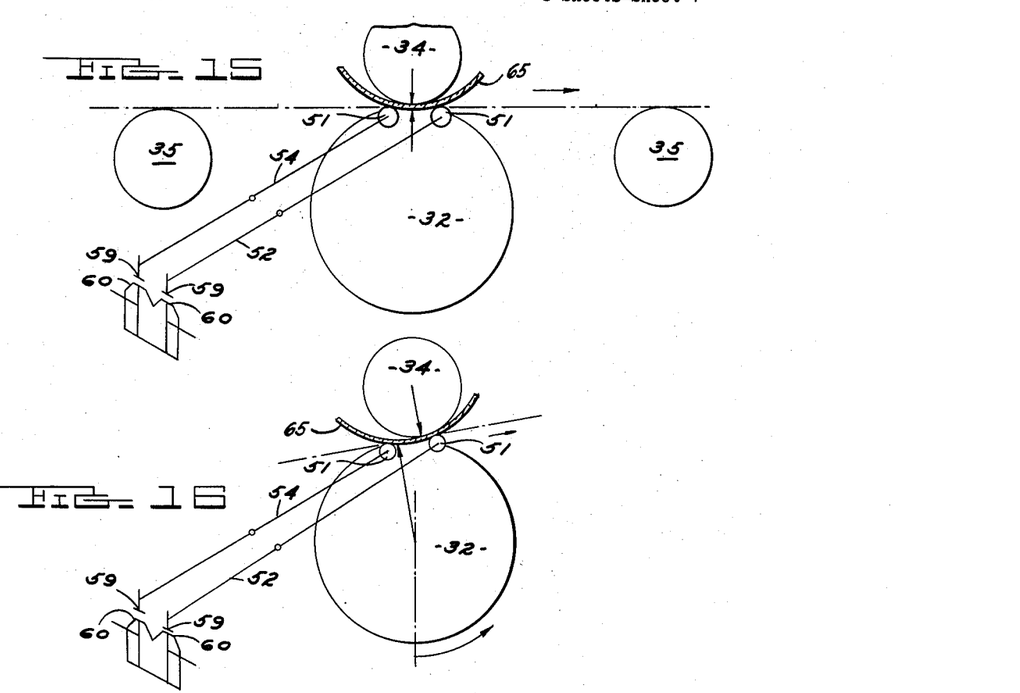
FIGURES 15–17 are diagrammatic views illustrating operation of the jet control responsive to the contour of the glass.
Figure 17:
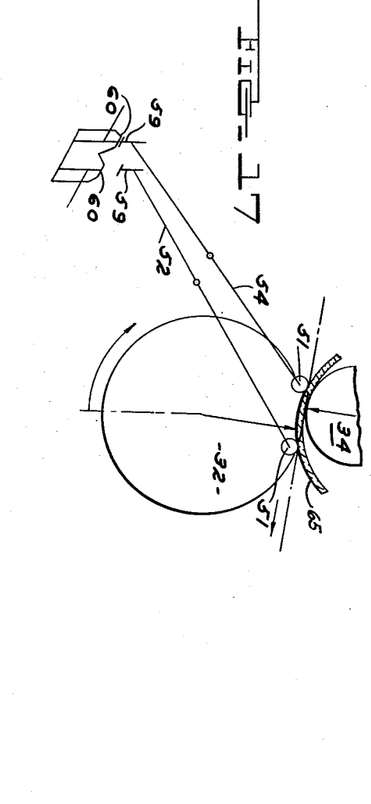

Referring now to FIGURE 14, in the machine of the present invention, the swinging of the frame 24 during the passage of the end portions of the windshield between the rolls is under the control of the "Askania" jet control system while swinging of the frame 24 during pressing of the mid-portion of the windshield is at a constant rate; the initiation and limit of the swing being under the control of cam operated switches.

The rocking frame 24 is inclined towards the entrance side of the rolls in the initial position, designated as No. 1 in FIGURE 14. The precise angle for the initial position of the frame to receive the entering top of the windshield assembly 65 is determined in part by the degree of "side wrap" of the windshield and may be set by a cam 92 fixed to a cam shaft 94 driven from the stub shaft 25 through a chain 95 and sprockets 96 and 97. A No. 1 cam switch 99 operated by the No. 1 cam 92 energizes an electric circuit to brake 44, the valve 85 being biased to direct hydraulic fluid from the pump 81 to the chamber 78 and to sump rather than to the motor 37 and to operate the brake so as to hold the rocking frame in position No. 1 (see FIGURES 10 and 14) for entrance of a windshield assembly. The valve 83 blocks lines 77 and 79 to motor 37.

Upon entrance of the assembly between the rolls and engagement of the assembly with the second roll 51 beyond the nip of the pressing rolls, the lower end of the lever 54 will be lifted slightly, thus lowering the pressure in line 71 and actuating a pressure responsive electric switch 100 (see FIGURE 9) to (1) operate the valve 83 to open lines 77 and 79 to jet 75 of the Askania" control and (2) interrupt the circuit to the brake 44 to cause the brake to release, thus releasing the frame 24 for rocking movement and placing it under the control of the "Askania" jet system.

Figure 11:
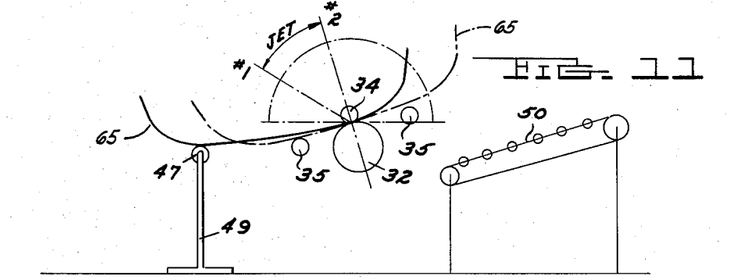
Figure 12:
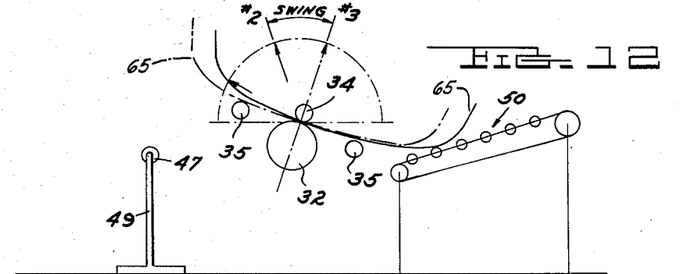

During pressing of the entering end portion of the windshield assembly 65, the entering portion of the assembly is supported between the pressing rolls, and the assembly also is supported by the roll 47 (see FIGURE 10). As the windshield assembly 65 passes between the rolls, the "Askania" jet control causes the plane of the axes of the pressing rolls to remain generally perpendicular to the portion of the glass engaged by the rolls, thus causing the frame 24 to move towards the vertical. When the frame 24 reaches position No. 2 (see FIGURES 11 and 14), No. 2 cam 101 fixed to cam shaft 94 operates the No. 2 cam switch 102, which releases the valve 83 to block the flow of hydraulic fluid to the motor 37. The No. 2 cam switch also simultaneously applies the brake 44. At the same time, the cam switch No. 2 actuates a time delay relay T3 which, after a fixed interval of time, releases the brake 44 and actuates the valves 85 and 86 to direct the flow of fluid to the motor 37 to rock the frame 24 past the vertical from position No. 2 to position No. 3 as indicated in FIGURE 14. The timing of the time delay relay is such that, at the time the swinging of frame 24 from position No. 2 to position No. 3 occurs, the windshield assembly 65 is about midway through the rolls. During pressing of the midportion, the assembly is supported first by the entering side outrigger roll 35 and between the pressing rolls and later by the pressing rolls and the exit side outrigger roll 35 (see FIGURE 12).

Upon the rocking frame 24 reaching position No. 3, indicated by FIGURE 14, a No. 3 cam 105 fixed to the cam shaft 94 operates a No. 3 cam switch 106 which releases valves 85 and 86. At the same time, cam No. 3 operates a time relay T1 which, after a fixed interval of time during which the assembly has advanced so that the forward end of the assembly has reached the conveyors, actuates valve 83 to open lines 77 and 79 leading to the motor 37 and returns the motor to jet control responsive to contour of the assembly.

During the interval that the trailing end portion of the windshield assembly 65 is being pressed, the frame 24 continues under "Askania" jet control, the inclination of the frame 24 increasing as the pressing rolls approach the end of the windshield until the frame 24 has reached an inclination corresponding with position No. 4 of FIGURE 14. At that time, a No. 4 cam 109 on the cam shaft 94 actuates a No. 4 cam switch which operates the valve 83 to block the lines 77 and 79 and also applies the brake 44 to hold the frame 24 in position No. 4 until the windshield assembly 65 has been discharged from between the pressing rolls (see FIGURE 13). Upon discharge of the windshield assembly 65 from between the pressing rolls, a switch 111 operated by dropping of the upper press rolls 34 opposing the lower drive rolls 32 operates a time delay relay T2 which, after a fixed interval of time, releases the brake 44 and actuates valve 85 and 86 to direct hydraulic fluid to the motor 37 in such a direction as to rock the frame 24 in the opposite direction and restore it to position No. 1, at which time the No. 1 cam 92 operates the No. 1 cam switch 99 to release valves 85 and 86, thus interrupting the flow of hydraulic fluid to the motor 37 and applies the brake 44 to hold the frame 24 in position No. 1 for receipt of the succeeding windshield assembly 65 to be pressed.

Figure 18:
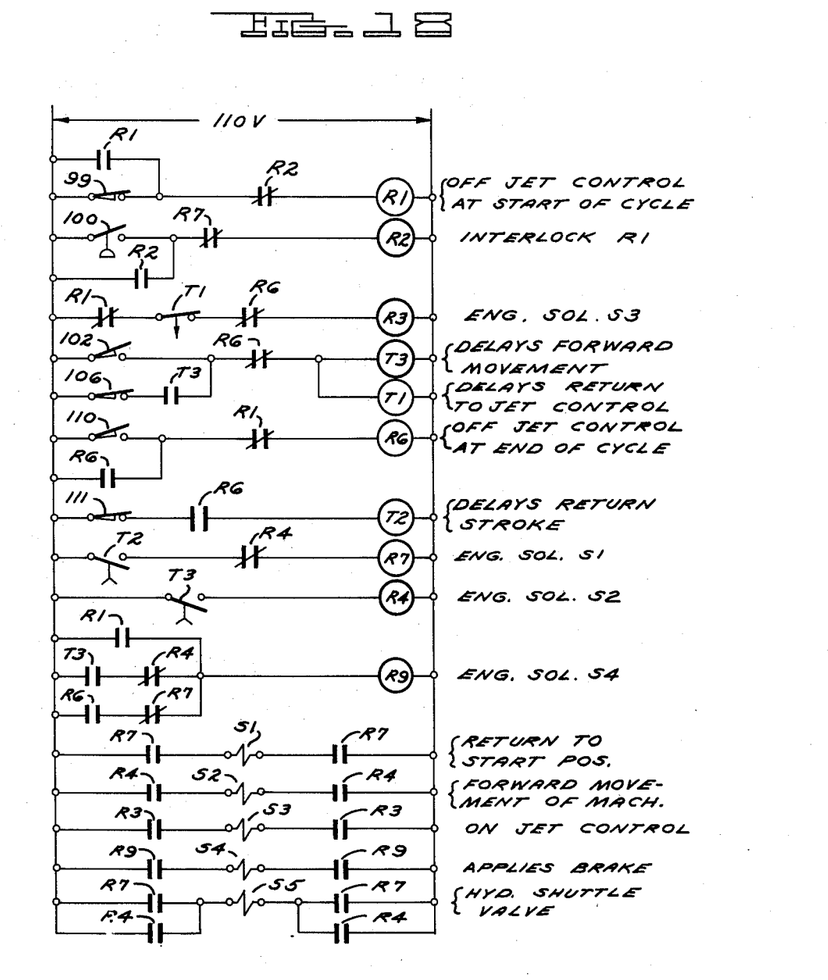
FIGURE 18 is a schematic wiring diagram of the electrical controls.

A schematic wiring diagram for operating the controls in the manner above described is indicated in FIGURE 18. In this figure, the circuits are shown not energized. The solenoids S1, S2, S3 and S5 control the hydraulic valves 86, 83 and 85 respectively (FIG. 9) while the solenoid S4 controls delivery of air to the pneumatically operated brake 44. The relays R1–R9 provide the necessary interlocks for actuating the solenoids to provide the operation described above. The time delay relays T1–T3 provide the necessary delay in actuating the circuits for operating the machine as described above.

While the machine of the present invention has been described in connection with the prepressing of a windshield assembly, it is equally well suited for prepressing other laminated curved glass shapes.

I claim:

1. In apparatus for preliminary pressing of bent, laminated glass and plastic assemblies having zones of varying degrees of longitudinal curvature, said apparatus including a pair of opposed nipper rolls having their axes lying generally in a common plane and urged together and supported by a frame mounted on a base for rocking movement about an axis generally parallel to the axes of the rolls; means, including a motor, for rocking the frame relative to the base, means for sensing the longitudinal inclination relative to the frame of that portion of the assembly engaged by the rolls, means for controlling the motor to position the frame at predetermined inclinations relative to the base during passage of a certain portion of the assembly between the rolls, said sensing means controlling the rocking motor during passage of other portions of the assembly between the rolls.

2. In apparatus for preliminary pressing of bent, laminated glass and plastic assemblies having a central zone of reduced curvature and end zones of greater curvature, said apparatus including a pair of opposed nipper rolls urged together and supported by a frame mounted on a base for rocking movement about an axis generally parallel to the axes of the rolls; a motor for rocking the frame relative to the base, means for sensing the longitudinal inclination relative to the frame of that portion of the assembly engaged by the rolls, means for controlling the motor responsive to the inclination sensing means during passage of the end zones of the assembly between the rolls, and means for controlling the motor to position the frame at predetermined inclination relative to the base during passage of the central zone between the rolls.

3. In apparatus for preliminary pressing of bent, laminated glass and plastic assemblies having zones of varying degrees of longitudinal curvature, said apparatus including a pair of opposed nipper rolls urged together and supported by a frame mounted on a base for rocking movement about an axis generally parallel to the axes of the rolls; means, including a motor, for rocking the frame, means for sensing the longitudinal inclination relative to the frame of that portion of the assembly engaged by the rolls, means for controlling the motor to position the frame at predetermined inclination relative to the base during passage of a portion of the assembly between the rolls, and means for controlling the motor responsive to the inclination sensing means during passage of another portion of the assembly between the rolls.

4. Apparatus for preliminary pressing of bent, laminated glass and plastic assemblies, comprising opposed nipper rolls having their axes lying generally in a single plane and urged together and between which the glass and plastic assemblies are adapted to be passed, the rolls supporting the assembly at one zone along its length, a second support for the assembly spaced from the rolls, a frame supporting the rolls, means for mounting the frame for rocking movement about an axis extending generally through the line of contact of the opposed rolls, power means for rocking the frame on its axis, a pair of assembly-contacting members located one on each side of the general plane of the axes of the rolls to sense the longitudinal inclination relative to the general plane of the axes of the rolls of that portion of the assembly adjacent the rolls, and means to control the power means responsive to the sensing of the assembly-contacting members to maintain the general plane of the roll axes perpendicular to the inclination of the portion of the assembly between the rolls.

5. Apparatus for preliminary pressing of bent, laminated glass and plastic assemblies, comprising opposed nipper rolls having their axes lying generally in a single plane and urged together and between which the glass and plastic assemblies are adapted to be passed, a frame supporting the rolls, means for mounting the frame for rocking movement about an axis extending generally parallel to the axes of the rolls, power means for rocking the frame on its axis, means for contacting the assembly adjacent the rolls to sense the longitudinal inclination relative to the general plane of the axes of the rolls of that portion of the assembly adjacent the rolls, and means to control the power means responsive to the sensing of the assembly-contacting means to maintain the general plane of the roll axes perpendicular to the inclination of the portion of the assembly between the rolls.

6. Apparatus for preliminary pressing of bent, laminated glass and plastic assemblies, comprising opposed nipper rolls having their axes lying generally in a single plane and urged together and between which the glass and plastic assemblies are adapted to be passed, a frame supporting the rolls, means for mounting the frame for rocking movement about an axis extending generally parallel to the axes of the rolls, power means for rocking the frame on its axis, and control means responsive to the longitudinal inclination relative to the general plane of the axes of the rolls of that portion of the assembly adjacent the rolls for controlling the power means to rock the frame during passage of the assembly and maintain the general plane of the axes of the rolls perpendicular to said inclination.

7. Apparatus for preliminary pressing of bent, laminated glass and plastic assemblies, comprising opposed nipper rolls having their axes lying generally in a single plane and urged together and between which the glass and plastic assemblies are adapted to be passed, a frame supporting the rolls, means for mounting the frame for rocking movement about an axis extending generally through the line of contact of the opposed rolls, power means for rocking the frame on its axis, and control means responsive to the longitudinal inclination relative to the general plane of the axes of the rolls of that portion of the assembly adjacent the rolls for controlling the power means to rock the frame during passage of at least a portion of the assembly and maintain the general plane of the axes of the rolls generally perpendicular to the inclination of the portion of the assembly between the rolls.

8. Apparatus for preliminary pressing of bent, laminated glass and plastic assemblies, comprising opposed nipper rolls having their axes lying generally in a single plane and urged together and between which the glass and plastic assemblies are adapted to be passed, a frame supporting the rolls, means for mounting the frame for rocking movement about an axis extending generally through the line of contact of the opposed rolls, power means for rocking the frame on its axis, a pair of assembly-contacting members located one on each side of the general plane of the axes of the rolls to sense the longitudinal inclination relative to the general plane of the axes of the rolls of that portion of the assembly adjacent the rolls, and means to control the power means responsive to the sensing of the assembly-contacting members to maintain the general plane of the axes of the rolls perpendicular to the inclination of the portion of the assembly between the rolls.

9. In apparatus for preliminary pressing of bent, laminated glass and plastic assemblies including a pair of opposed nipper rolls urged together, having their axes lying generally in a single plane and supported by a frame mounted for rocking movement about an axis generally parallel to the axes of the rolls; a motor for rocking the frame, and motor control means, including a pair of assembly-contacting members located one on each side of the general plane of the axes of the rolls to sense the longitudinal inclination of that portion of the assembly relative to the general plane of the axes of the rolls, a pair of fluid pressure lines, valve means operated by the assembly-contacting members for creating a differential in pressure between said fluid pressure lines responsive to movement of said members, and means responsive to said pressure differential for controlling the motor to tilt the frame until the pressures are balanced to maintain the general plane of the axes of the rolls generally perpendicular to the inclination of the portion of the assembly between the rolls.

10. In apparatus for preliminary pressing of bent, laminated glass and plastic assemblies including a pair of opposed nipper rolls urged together, having their axes lying generally in a single plane and supported by a frame mounted for rocking movement about an axis generally parallel to the axes of the rolls; a motor for rocking the frame, and motor control means, including a pair of assembly-contacting members located one on each side of the general plane of the axes of the rolls to sense the longitudinal inclination of that portion of the assembly relative to the general plane of the axes of the rolls, a pair of fluid pressure lines, means for creating a differential in pressure between said fluid pressure lines responsive to movement of the assembly-contacting members, and means responsive to said pressure differential for controlling the motor to tilt the frame until the pressures are balanced to maintain the general plane of the axes of the rolls generally perpendicular to the inclination of the portion of assembly between the rolls.

References Cited in the file of this patent

UNITED STATES PATENTS

| | | |
|---|---|---|
| 2,025,115 | Lytle | Dec. 24, 1935 |
| 2,340,933 | Chilton | Feb. 8, 1944 |
| 2,673,168 | Pascoe et al. | Mar. 23, 1954 |
| 2,729,581 | Pascoe et al. | Jan. 3, 1956 |
| 2,776,510 | Klopfenstein | Jan. 8, 1957 |
| 2,825,671 | Langhart et al. | Mar. 4, 1958 |
| 2,849,345 | Smith et al. | Aug. 26, 1958 |
| 2,893,905 | Makovic | July 7, 1959 |
| 2,995,480 | Williams | Aug. 8, 1961 |
| 3,048,214 | Madge et al. | Aug. 7, 1962 |
| 3,089,408 | Swindler | May 14, 1963 |